W. GRIFFITH.
Vine-Protector.
No. 64,760.          Patented May 14, 1867.
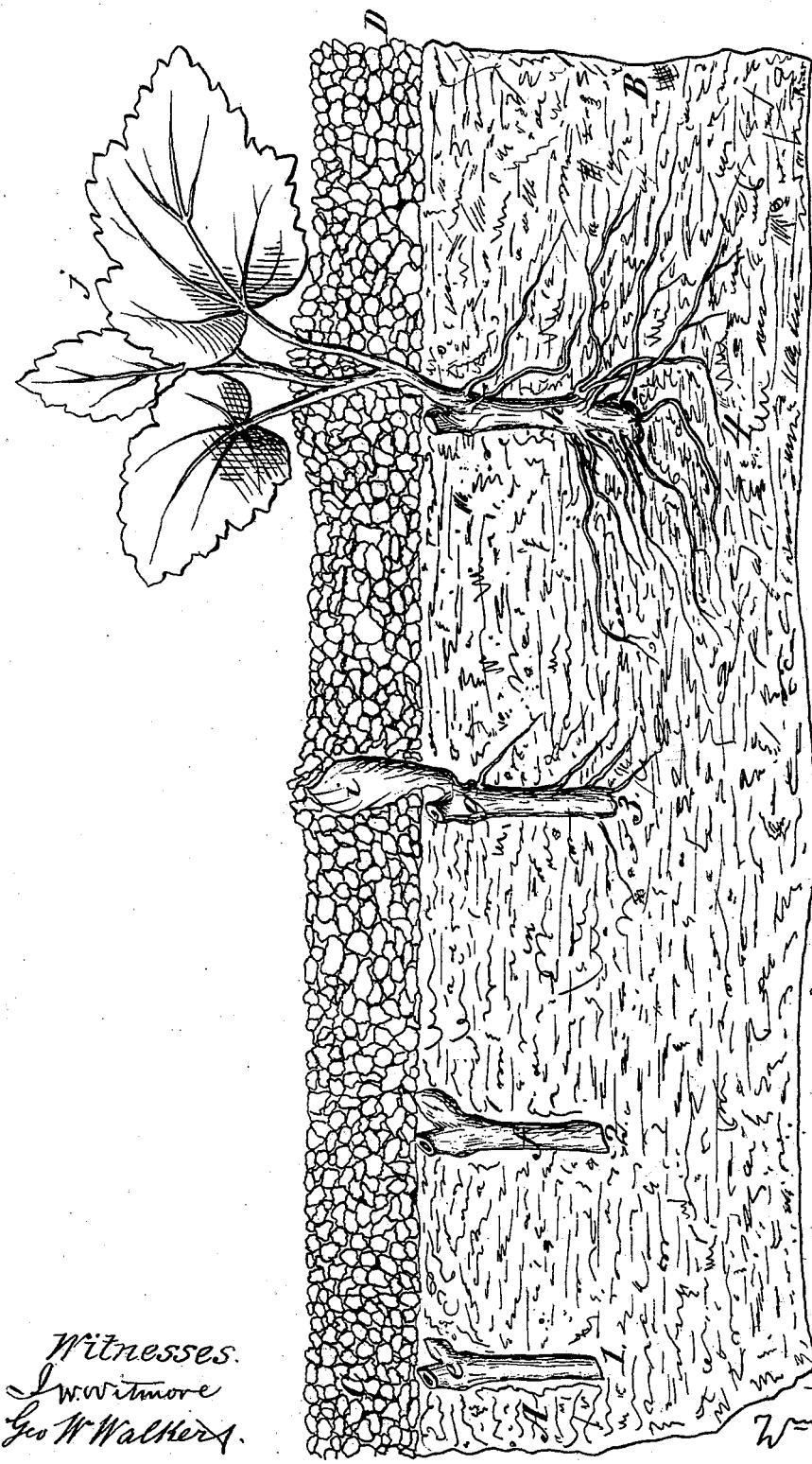
Witnesses.
J. W. Witmore
Geo. W. Walker
Inventor.
Wm Griffith

United States Patent Office.

WILLIAM GRIFFETH, OF NORTH EAST, PENNSYLVANIA.

Letters Patent No. 64,760, dated May 14, 1867.

---

MODE OF PROPAGATING GRAPE-VINES FROM SINGLE BUDS IN THE OPEN FIELD.

---

*The Schedule referred to in these Letters Patent and making part of the same.*

---

TO ALL WHOM IT MAY CONCERN:

Be it known that I, WILLIAM GRIFFETH, of North East, in the county of Erie, and State of Pennsylvania, have invented a new and useful Improvement in the Mode of Propagating Grape-Vines in open-field culture; and I do hereby declare that the following is a full, clear, and exact description of the same, reference being had to the annexed drawings, making part of this specification, in which the process is shown in a vertical section of the ground in which the cuttings are placed for propagation.

I will first explain in detail my mode of propagation, and then indicate wherein it differs from other known modes. The ground is first prepared by the usual mode of cultivation for the reception and development of the cutting, so as to be ready at what may be described as the season of early garden-making. This season is of course dependent upon climatic conditions. In the region in which I live it will ordinarily be about the 10th of April. It must, under all conditions, be so early in the spring that the earth is still at a reduced temperature, before the increasing power of the sun has entirely overcome the influence of winter, but not so early as not to have heat enough in the earth to develop vegetable action. The pieces of vine to be sprouted are cut in pieces of say two inches in length, and with a single bud at one end. These cuttings are then planted in rows at a distance apart of say from four to six inches, and so that the bud shall be uppermost and about even with or a very little below the surface of the earth. The whole is then covered with a cold mulch of saw-dust, tan, or other suitable material, to the depth of say from one to two inches. I prefer under ordinary conditions a covering of two inches, or a little less. The object of this mulch is to protect the earth from the heating influence of the sun and retain it at a temperature lower than that of the earth, when not thus covered, so as to delay the sprouting of the bud until the rootlets have had opportunity to sprout and provide the sustenance which is necessary to the support and development of the sprout. These rootlets will grow at a temperature lower than that which is necessary for the development of the sprout from the bud, and by delaying the expansion of the bud I am enabled to secure the life of the sprout by first developing the growth of the roots to the extent required for the vigorous life of the sprout. When the roots are started the gradually increasing heat of the sun will effect the expansion of the bud and the growth of the sprout, which, passing through the mulch, will develop on reaching the air. When the sprout is sufficiently developed I remove part or the whole of the mulch. The ordinary mode of open-field propagation is to use long cuttings with two or more buds, generally three or four, which are planted with one bud out of the ground. The growth of the shoots from these buds is always uncertain, and the plants are feeble from a lack of root to supply the requirements of the shoot. On an average probably two-thirds of these cuttings are entirely lost, so that less than one-tenth of the buds used are developed into vines. To remedy this great waste resort is had to hot-house culture in which a mulch has been used, but as the earth is warm in such cases an artificial stimulus is given to the growth of the roots by heating the earth in which the cuttings are planted from below, so that, the temperature being greater at the lower end of the cutting than at the bud, the rootlets may grow faster than the shoots from the bud. But as this difference of temperature is necessarily slight, great numbers of the buds are lost from not having an adequate supply of nourishment from the roots, and probably one-half of the buds are lost in this mode of culture, which is expensive, and subject to the additional objection that plants transplanted from forcing-beds to the open field are delicate and wanting in the vigor of plants growing in the open air under normal conditions.

The difference between my mode and either of these is in the use of cold mulch in open-field culture applied sufficiently deep to retain the low temperature of the cold earth, and which distinguishes it from all known modes of open-field culture. The distinction between my mode and the forcing-bed process is, that I rely upon retaining the bud at a temperature below that required for its development until the roots which will grow at that temperature are developed, while in the hot-bed process the growth of the root is made to depend upon the stimulus of artificial heat applied in excess to the roots.

What I claim as my invention, and desire to secure by Letters Patent, is—

The mode of propagating grape-vines, substantially as set forth, in open-field culture, by covering single-bud cuttings with a cold mulch, applied in sufficient depth to keep down the temperature of the bud, and thereby retard its sprouting until the roots have been adequately developed.

WM. GRIFFETH.

Witnesses:
J. W. WITMORE,
E. P. BENNETT.